United States Patent
Morimoto et al.

(10) Patent No.: US 6,491,121 B2
(45) Date of Patent: Dec. 10, 2002

(54) POWER-GENERATING CONTROL APPARATUS FOR VEHICLE

(75) Inventors: Kazuhiko Morimoto, Hamamatsu (JP); Yoshiaki Omata, Hamamatsu (JP)

(73) Assignee: Suzuki Motor Corporation, Hamamatsu (JP)

(*) Notice: Subject to any disclaimer, the term of this patent is extended or adjusted under 35 U.S.C. 154(b) by 0 days.

(21) Appl. No.: 09/851,914

(22) Filed: May 9, 2001

(65) Prior Publication Data

US 2001/0040060 A1 Nov. 15, 2001

(30) Foreign Application Priority Data

May 11, 2000 (JP) .................................. 2000-138398

(51) Int. Cl.$^7$ .................................................. B60L 8/00
(52) U.S. Cl. ..................... 180/65.3; 180/65.2; 180/65.1
(58) Field of Search .............................. 180/65.3, 65.2, 180/65.1, 65.4; 318/587, 370, 445; 324/427

(56) References Cited

U.S. PATENT DOCUMENTS

| | | | |
|---|---|---|---|
| 4,860,209 A | * 8/1989 | Sugimoto et al. | 318/587 |
| 5,757,153 A | * 5/1998 | Ito et al. | 318/370 |
| 5,765,656 A | * 6/1998 | Weaver | 180/65.3 |
| 5,789,923 A | * 8/1998 | Shimoyama et al. | 324/427 |
| 5,839,533 A | 11/1998 | Mikami et al. | |
| 5,841,201 A | 11/1998 | Tabata et al. | |
| 5,883,481 A | * 3/1999 | Ito et al. | 318/445 |
| 5,895,333 A | 4/1999 | Morisawa et al. | |
| 5,898,282 A | * 4/1999 | Drozdz et al. | 180/65.4 |
| 5,935,040 A | 8/1999 | Tabata et al. | |
| 6,109,237 A | 8/2000 | Pels et al. | |
| 6,114,775 A | 9/2000 | Chung et al. | |
| 6,116,364 A | 9/2000 | Taguchi et al. | |
| 6,234,932 B1 | 5/2001 | Kuroda et al. | |
| 6,278,915 B1 | * 8/2001 | Deguchiet et al. | 180/65.3 |
| 6,335,574 B1 | 1/2002 | Ochiai et al. | |
| 6,345,216 B1 | 2/2002 | Morimoto et al. | |
| 6,348,771 B1 | 2/2002 | Morimoto et al. | |
| 6,362,580 B1 | 3/2002 | Omata et al. | |
| 2002/0020571 A1 | 2/2002 | Morimoto et al. | |
| 2002/0021007 A1 | 2/2002 | Morimoto et al. | |

FOREIGN PATENT DOCUMENTS

| | | |
|---|---|---|
| JP | 9-25864 | 1/1997 |
| JP | 9-65504 | 3/1997 |
| JP | 9-84210 | 3/1997 |
| JP | 11-257120 | 9/1999 |

* cited by examiner

Primary Examiner—Brian L. Johnson
Assistant Examiner—Hau Phan
(74) Attorney, Agent, or Firm—Flynn, Thiel, Boutell & Tanis, P.C.

(57) ABSTRACT

A power-generating control apparatus for a vehicle having an engine and a power-generator operated by the engine or electric motor includes a slowdown detector to detect a slowdown state of the vehicle, a main battery for the vehicle, and a sub-battery. The control apparatus includes a switch-over device which switches over at least one of the main battery and the sub-battery to the power-generator or motor, which in a slowdown state detected by the slowdown detector, switches over to couple the power-generator or the motor and the sub-battery. In engine stop, the switch over device switches to the sub-battery as a power supply of operating load. Accordingly, because the sub-battery can absorb slowdown energy, driving efficiency of the power-generator or motor at slowdown becomes excellent.

20 Claims, 8 Drawing Sheets

POWER-GENERATING CONTROL APPARATUS FOR VEHICLE

FIELD OF THE INVENTION

This invention relates to a power-generating control apparatus for a vehicle which enables a second power supply to absorb slowdown energy and permits revived driving efficiency for an electric power generator or electric motor during vehicle slowdown.

BACKGROUND OF THE INVENTION

In a hybrid vehicle, an engine driven by combustion of fuel connects directly to an electric motor (called "motor" hereinafter) which drives by electric energy and has a power-generating function.

The hybrid vehicle includes an engine control means for controlling a running state of the engine and a motor control means for controlling an operating state of the motor. Because the engine control means and the motor control means detect respective operating states of the engine and the motor when the vehicle is traveling, and the respective operating states of the engine and the motor are controlled in association with one another, such control system attains a high level of required performance (such as fuel efficiency, lower values of detrimental components in exhaust gases, and power performance).

In this case, a battery that supplies driving electric power to a motor and that is charged by generated electric power of the motor is established. The battery is administered for controlling driving power-generation/driving prohibition of the motor on the basis of a remaining quantity of energy in the battery.

Moreover, there is a hybrid vehicle which has an automatic start-up/stop control means to improve fuel efficiency or reduce effluent gas, by stopping an engine forcibly when stopping in an idling state.

One such example of a power-generating control apparatus of a vehicle is disclosed in published Japanese Application Laid-Open No. 11-257120. In an engine automatic stop/start-up control apparatus indicated in this disclosure, the capacitor which is used for driving a starter motor and charging a 12V supporting battery is charged by generated electric power that a motor driven by an engine generates. In an electronically controlled unit, based on a remaining residual capacity of a capacitor that is detected by a capacitor residual capacity sensor and consumed electric power that is detected by a 12V-based consumed electric power sensor, a determination is made as to whether an engine can restart by operating a starter motor by electric power of the capacitor, even if the engine is stopped. When electric power of the capacitor remains sufficient, the engine is stopped. As a result, fuel consumption is reduced. When electric power of the capacitor is not sufficient, the engine is not stopped, but is maintained in an idle driving state. Then, when the engine already is stopped, the engine is started up by operating a starter motor. Thus, by extending stop time of the engine of the vehicle as long as possible, the system reduces fuel consumption, and ensures performance of restart.

Incidentally, in a traditional vehicle, system maintenance of fuel injection and consumption of electricity by lights, a blower and windshield wipers are supplied by generated electric power of an alternator. Further, charging of a battery is performed simultaneously.

However, because most of the above-mentioned examples provide loading of an engine, fuel consumption is accompanied. Accordingly, there is inconvenience to be disadvantageous economically.

And, because it is the situation that charge (say "revival") at slowdown in which fuel does not need is not utilized positively, the improvement is expected.

In order to obviate or minimize the above inconvenience, a power-generating control apparatus, for a vehicle having an engine and a power-generator operated by the engine or electric motor, includes: a slowdown detecting means to detect a slowdown state of the vehicle, a main battery for the vehicle, and a sub-battery. The control apparatus includes a switch-over means which switches over at least either of the main battery and the sub-battery to the power-generator or motor, which in a slowdown state, in response to a detected signal from the slowdown detecting means, switches over to couple the power-generator or the motor and the sub-battery. In engine stop, the switch-over device switches over to the sub-battery as a power supply of operation load.

Accordingly, at slowdown, the sub-battery can be sufficiently charged to be used as a power supply for load operation, such as a control system of the engine and motor, a lamp and an air conditioning apparatus. Further, electric power of the main battery used at start-up is maintained.

Moreover, the present invention provides a power-generating control apparatus for a vehicle which disposes an engine and a power-generator operated by the engine or electric motor, comprising: a slowdown detecting means to detect a slowdown state of a vehicle; a first power supply as a main battery for the vehicle and a second power supply as a sub-battery; and a switch-over means which switches over at least either of the main battery and sub-battery to the power-generator or motor, which in slowdown state, in response to a detected signal from the slowdown detecting means, switches over to couple the power-generator or the motor and sub-battery. Moreover, when capacity of the sub-battery is larger than a predetermined value, the switch-over means switches to link the sub-battery to a power supply line. Accordingly, when the sub-battery is fully charged, it can always assist as a supporting power supply for the main battery. Further, this system can prevent an electric discharge and deterioration of a first power supply, and can contribute to stabilization of a vehicle system and improvement thereof.

By this invention, at slowdown, the sub-battery can be charged sufficiently to be used as a power supply for operation load, such as a control system for the engine and motor, a lamp and an air conditioning apparatus. Further, electric power of the main battery used at start-up is maintained. As a result, a quantity of charge needed for the main battery is decreased, and power-generating load by the power-generator or motor is reduced. Accordingly, this system can contribute to reduction of fuel usage. Moreover, because the sub-battery can absorb slowdown energy, driving efficiency of the motor at slowdown becomes excellent.

DETAILED DESCRIPTION OF THE INVENTION

The present invention will now be described in specific detail with reference to FIGS. 1–5, which illustrate a first embodiment of the invention.

Figure 2:
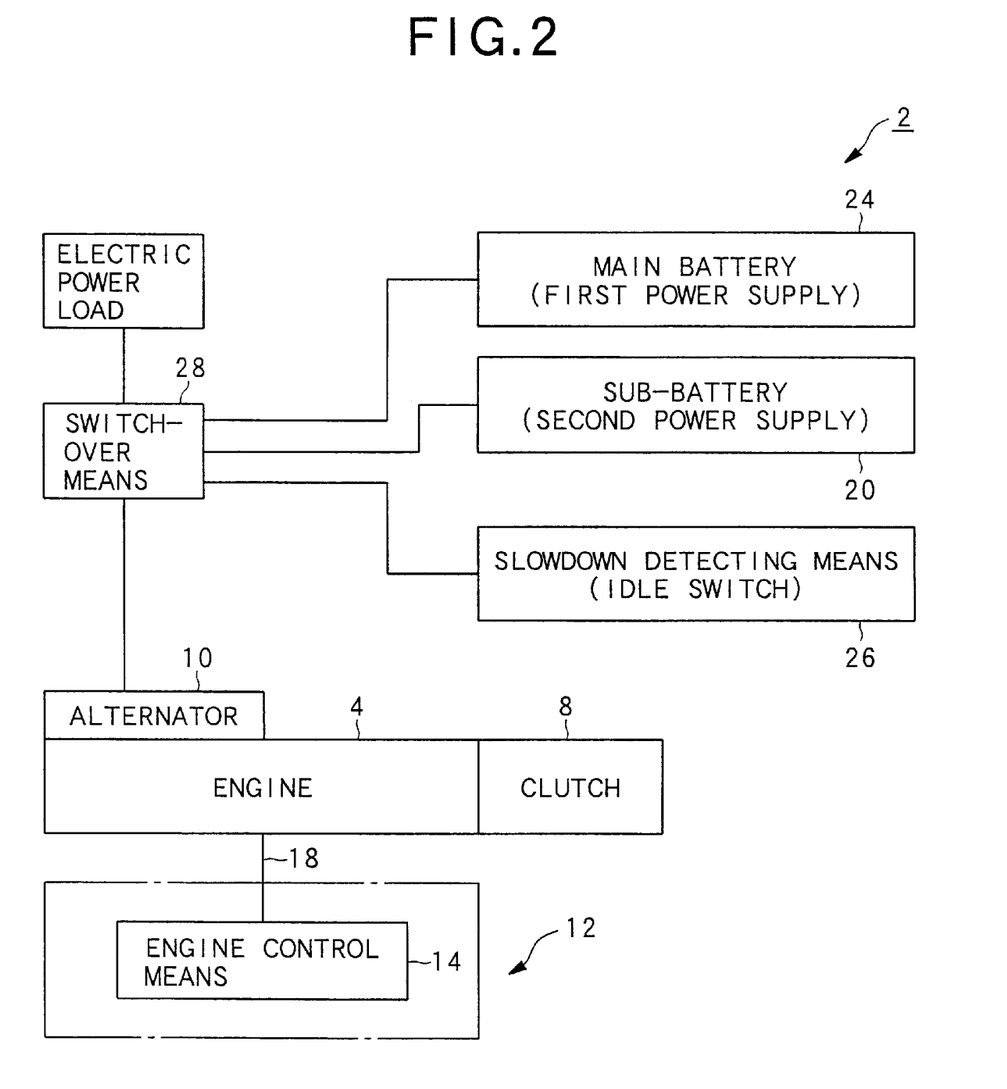
FIG. 2 is a block diagram showing a system of a power-generating control apparatus for a vehicle.

FIG. 2 shows a power-generating control apparatus 2 for a vehicle (not shown), an engine 4, and a clutch 8.

A transmission (not shown) is connected with engine 4 through the clutch 8. The engine 4 includes an alternator 10 for power-generation, an air-compressor (not shown) for an air-conditioner (A/C) and a starter motor (not shown). The vehicle includes an engine control means 14 of control unit 12 to control a driving state of the engine 4.

The engine 4 is connected to the engine control means 14 through an engine-controlling signal line 18. "Line" is used herein to describe any electrical signal conduit. The engine control means 14 is linked to a sub-battery 20 that is a second power supply, through an engine control means-dedicated power line (not shown). A main-battery 24, that is a first power supply, is linked to the alternator 10 for power-generation.

Further, a slowdown detecting means 26 to detect a slowdown state of a vehicle and a switch-over means 28 are provided. The switch-over means 28 which switches over between at least either of main battery 24 that is first power supply and sub-battery 20 that is second power supply, to the alternator 10 for power-generating. In a slowdown state, a detected signal from the slowdown detecting means 26 enables switch-over means 28 to couple the alternator 10 that is a power-generator and the sub-battery 20 that is second power supply. In engine stop, the switch-over means 26, switches over to the sub-battery 20 as a power supply for a load operation.

Specifically, the slowdown detecting means 26 consists, for example, of an idle switch and detects a slowdown state of a vehicle by switch-over operations from an "ON" state to an "OFF" state by the idle switch.

The switch-over means 28 has a function of switching over to main battery 24 as a power supply of operation load in start-up of the engine 4.

Further, when a voltage of sub-battery 20 is higher than a predetermined voltage, for example a predetermined value, the switch-over means 28 functions to switch over to a power supply of operation load in engine standstill.

Furthermore, when the charge capacity of sub-battery 20 is larger than a predetermined value, the switch-over means 28 has a function for switching over so as to couple sub-battery 20 and a power supply line 32 as discussed later.

For the main battery 24 that is a first power supply, a storage battery is used. The sub-battery 20 that is a second power supply can be a capacitor.

Figure 3:
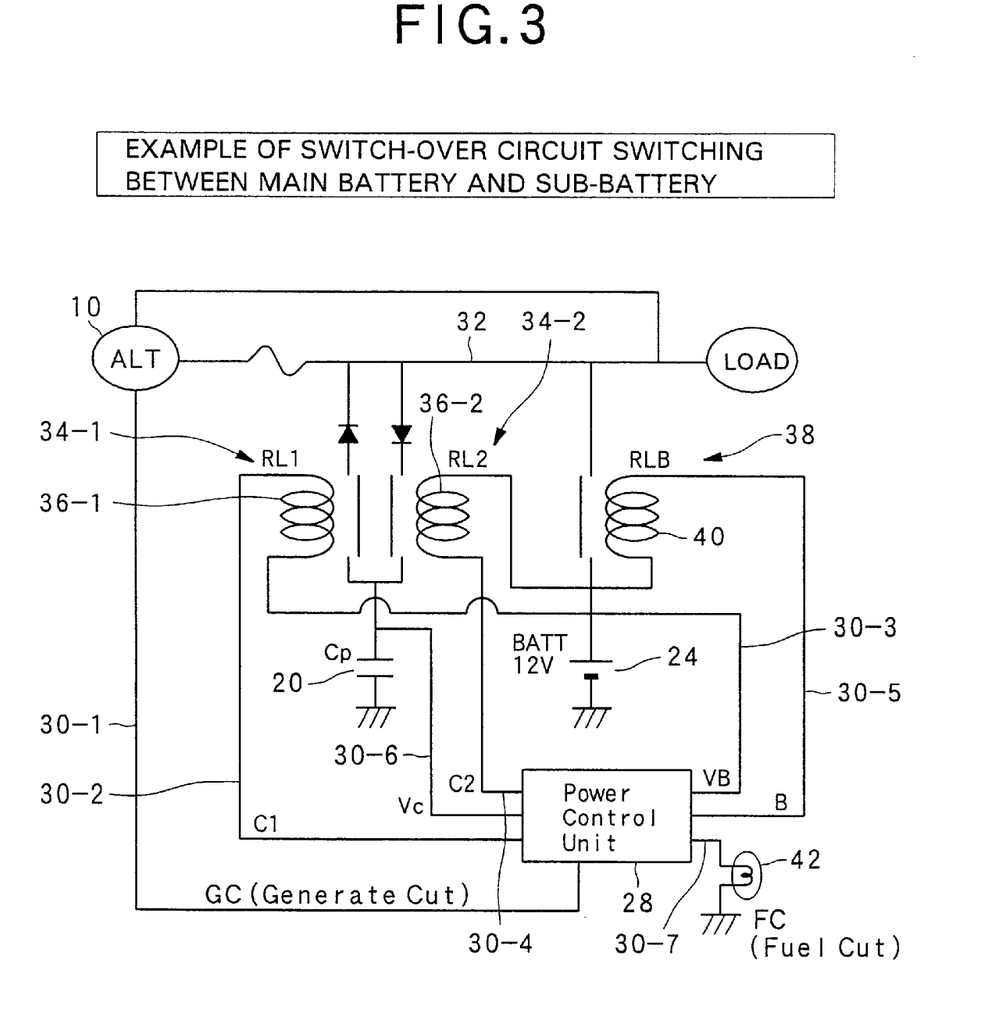
FIG. 3 is an illustration showing a switch-over circuit for switching over a main battery and a sub-battery.

Incidentally, the engine 4 possesses an automatic start-up/stop system (called "an idle stop system"). Here, a switch-over circuit including the switch-over means 28 is explained as follows. As shown in FIG. 3, the switch-over means (labeled "Power Control Unit") 28 is linked to alternator (labeled "ALT") 10 through first signal line 30-1. Alternator 10 is linked to electric power load (labeled "LOAD") through power supply line 32.

First and second relays 34-1, 34-2 (labeled "RL1" and "RL2") are made for the sub-battery 20 (labeled "Cp"). A first coil part 36-1 of the first relay 34-1 is linked to the switch-over means 28 through second signal line 30-2, and the main battery 24 (labeled "BATT") is linked to the switch-over means 28 through a third signal line 30-3, and a second coil part 36-2 of the second relay 34-2 is linked to the switch-over means 28 through a fourth signal line 30-4, and a coil part 40 of a relay 38 (labeled "RLB") of the main battery 24 is linked to the switch-over means 28 through a fifth signal line 30-5.

Further, the sub-battery 20 is linked to the switch-over means 28 through a sixth signal line 30-6. Furthermore, a fuel cut system 42 (labeled "FC (Fuel Cut )") is linked to the switch-over means 28 through a seventh signal line 30-7.

Symbols in FIG. 3 are as follows. "GC" (Generate Cut) for first signal line 30-1 is a power-generate cut symbol. "C1" for second signal line 30-2 is a first coil part signal. "VB" for third signal line 30-3 is a battery voltage signal. "C2" for fourth signal line 30-4 is a second coil part signal. "B" for fifth signal line 30-5 is a coil part signal for battery. "Vc" for sixth signal line 30-6 is a supporting battery voltage signal.

For reference, a major consumption electric current generally is as follows.

(1) System maintenance in idle stop: 5 Amps (A).
(2) Stop lamp: 5 Amps (usually when brake pedal is applied).
(3) Blinker lamp: 3 Amps.
(4) Radio: 3 Amps.
(5) Blower (Low): 6 Amps.

Therefore, the alternator 10 needs to provide 10–20 Amps.

Alternator 10 can output 50–60 A at a voltage of about 14V. Therefore, alternator 10 can output enough current, 30–40 A, if 12V battery is at a usual state, and a remained share is saved in sub-battery 20 at a recharged or revived power-generation.

Figure 5:
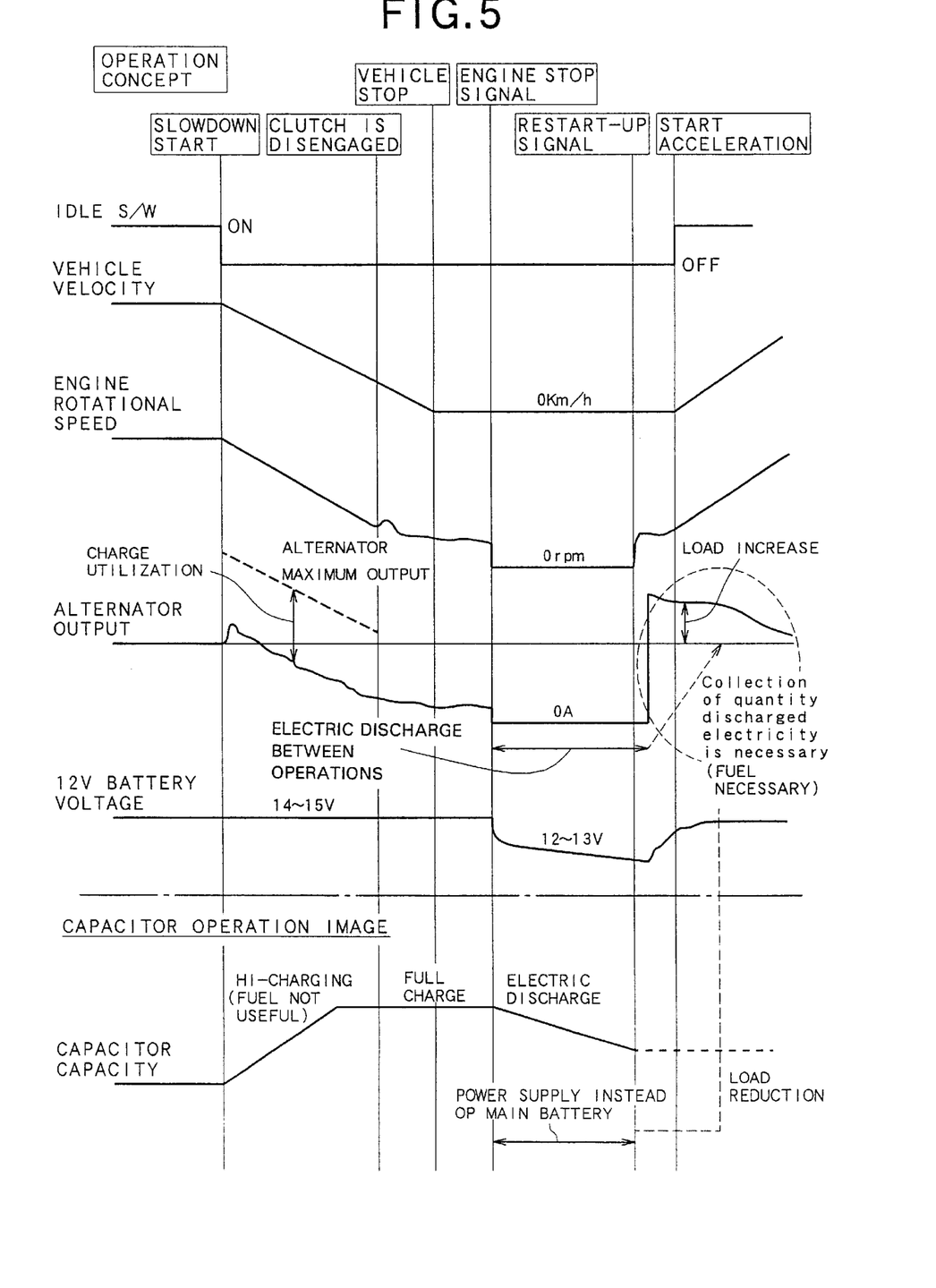
FIG. 5 is a timing chart showing an operation concept of a power-generation apparatus for a vehicle.

An operation of power-generation control unit 2 of the vehicle is explained to the following effect. In engine 4 possessing an automatic start-up/stop system (called "idle stop system") as shown in FIG. 5, when slowdown detecting means 26 detect a slowdown state, the charge circuit of alternator 10 that is linked to 12V main battery 24 is also linked to sub-battery 20. The sub-battery 20 is instantly charged by the greatest power-generation ability of alternator 10.

When the engine 4 is stopped by automatic start-up/stop system after a vehicle is stopped, electric power for maintenance of the engine control system and operation of supplementary instruments, such as a blinker, blower and so on, is supplied directly from sub-battery 20.

Electric power supply for maintenance of the system and operation of supplementary instruments is provided by main battery 24. The main battery 24 is charged so as to be assisted by sub-battery 20. As a result, over consumption of main battery 24 is prevented.

Moreover, when the engine 4 re-starts up and alternator 10 starts to function, the alternator 10 is linked to main battery 24 of 12V.

Figure 1:
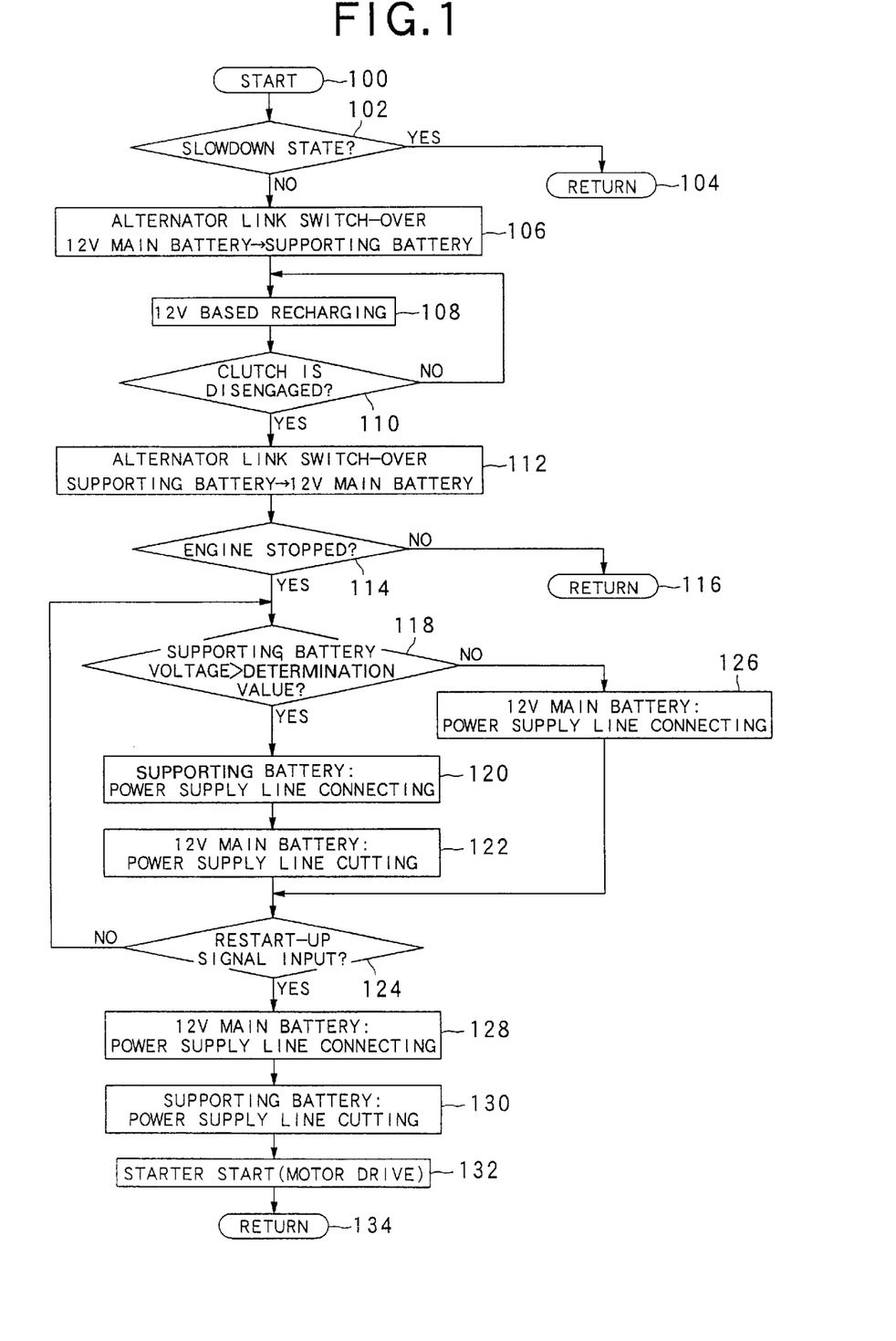
FIG. 1 is a power-generating control flowchart of a power-generating control apparatus for a vehicle showing a first embodiment of the present invention.

Operation of the embodiment will now be described with reference to a power-generating control flowchart in FIG. 1. In FIG. 1, operation begins at step 100, then a determination is made at step 102 as to whether the vehicle is in slowdown state. When the determination in step 102 results in "NO", then the routine is returned at step 104. When the determination in step 102 results in "YES", then switch-over processing for linking to the alternator 10 is executed at step 106.

The switch-over processing for linking to the alternator 10 in step 106 is for switching over the coupling state from alternator 10 and main battery 24 to alternator 10 and sub-battery 20 as a supporting battery.

After the switch-over processing for linking to alternator in step 106, 12V based charge processing is executed in step 108, and the sub-battery 20 is charged.

A determination is made at step 110 as to whether the clutch is cut (disengaged), and if the determination in step 110 results in "NO", then the routine is returned to 12V based charge processing at step 108. If the determination in step 110 results in "YES", then the switch-over processing for linking to alternator 10 is executed at step 112 again. Therefore, the again switch-over processing for linking to alternator 10 in step 112 is of switching over a coupling state from alternator 10 and sub-battery 20, as a supporting battery, to alternator 10 and main battery 24 of 12V.

After the switch-over processing for linking to alternator in step 112, a determination is made at step 114 as to whether the engine 4 is stopped. If the determination in step 114 is "NO", then the routine is returned at step 116. If the determination in step 114 is "YES", then a determination is made at step 118 as to whether supporting battery voltage Vc exceeds a criterion value or a predetermined value. If the determination in step 118 is "YES", then sub-battery 20, as a supporting battery, is linked to power supply line 32 at step 120, and coupling of main battery 24 to power supply line 32 is cut. A determination is then made at step 124 as to whether a re-start signal is input.

If the determination in step 118 is "NO", then main battery 24 is linked to power supply line 32. Next, a determination is made at step 124 as to whether a re-start signal is input. If the determination in step 124 is "NO", then the routine is returned to the determination in step 118 as to whether supporting battery voltage Vc exceeds a criterion value.

Figure 4:
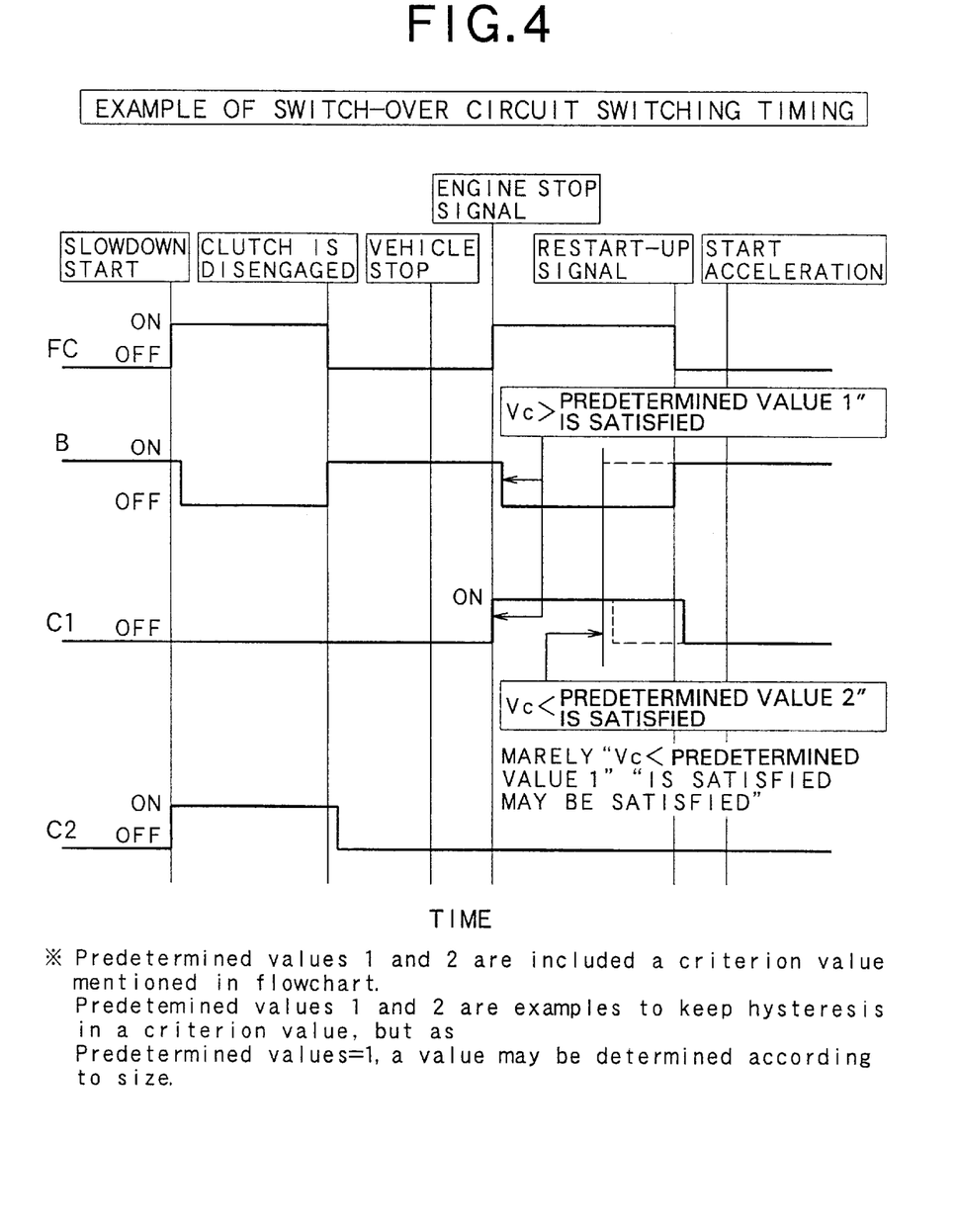
FIG. 4 is a timing chart showing switching timing for a switch-over circuit.

Incidentally, in the determination of step 118 as to whether the above-mentioned supporting battery voltage Vc exceeds a criterion value, as shown a solid line in FIG. 4, one "regular value 1" can be set as a criterion value. And as shown a dashed line in FIG. 4, two "regular values 1 and 2" can be set as a criterion value. This system can have a means to take hysteresis into account for the criterion value.

By this means, at slowdown, sub-battery 20 that is a second power supply can be sufficiently charged, particularly at engine stop in a vehicle having an idle stop system, so that the sub-battery 20 can be used as a power supply for operating load, such as for a control system of the engine 4, a lamp and an air conditioning apparatus. Further, electric power of the main battery 24 that is a first power supply used in a start-up can be maintained. As a result, because a quantity of charge for main battery 24 is decreased, power-generating load by alternator 10 that is an electric power-generator can be reduced. Therefore, this system can contribute to improvement of fuel efficiency.

Moreover, sub-battery 20 that is second power supply can absorb a slowdown energy that is not utilized conventionally. As a result, a recharging driving efficiency of alternator 10 that is an electric power generator in slowdown becomes excellent. Accordingly, this system is profitable in practical use.

Furthermore, the switch-over means 28 functions to switch over control so as to use main battery 24 as a power supply of operating load at start-up of the engine 4. At engine stop, main battery 24 of which electrical charge is maintained, can also be used. Accordingly, performance of start-up becomes excellent, and this system can contribute to stabilization of an engine control system and improvement of the product.

Moreover, the switch-over means 28 can include a function switching over control so as to use, as a power supply for operation load at engine stop, the voltage of sub-battery 20 when the voltage is larger than a predetermined value, for example, a criterion value. When a voltage of sub-battery 20 is lower than a predetermined value, when it is not fully charged, the sub-battery 20 is not used as a power supply of a vehicle. Accordingly, operation defectiveness is not given rise to by various loads of the vehicle. As a result, this system can contribute to stability of operation of electrical elements for vehicles and improvement of the product.

Furthermore, when the charge quantity of sub-battery 20 is larger than a predetermined value, the switch-over means 28 functions to switch over to link the alternator 10 that is a power-generator to power supply line 32. Then when sub-battery 20 is fully charged, the sub-battery 20 can always assist as a supporting power supply for main battery 24. Accordingly, this system can prevent an electric discharge and deterioration of the main battery 24, and can contribute to stabilization of the system and improvement thereof.

Further, for the main battery 24 that is first power supply, a storage battery is used. For the sub-battery 20 that is second power supply, a capacitor is used. Accordingly, the main battery 24 is usually used at start-up, and a storage battery with great capacity is used. Because charge of the sub-battery 20 needs to finish in a short time at slowdown, a capacitor of which internal resistance is small is used. Thus, this system can make the best use of a characteristic of each power supply, and is advantageous in practical use.

Furthermore, because an automatic start-up/stop system (called "idle stop system") is possessed in the engine 4, the automatic start-up/stop system can stop engine 4 when the vehicle stops because of waiting for a traffic light to change. Then, when one power supply only is arranged, the use condition for the power supply becomes severe. However, because this system arranges special sub-battery 20, which functions as power supply when the engine stops, a system with good start-up performance can be realized.

Figure 6:
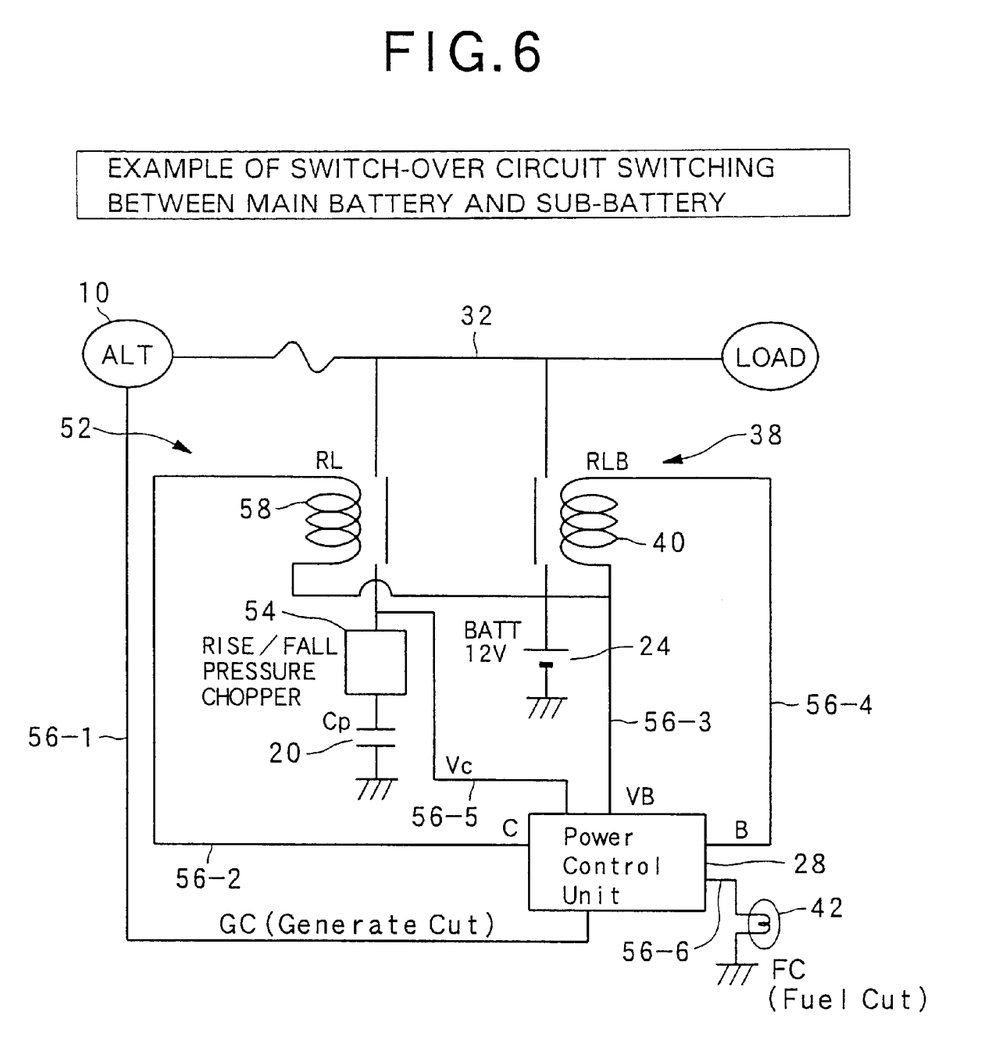
FIG. 6 is an illustration showing a switch-over circuit for switching over a main battery and a sub-battery in a second embodiment of the present invention.
Figure 7:
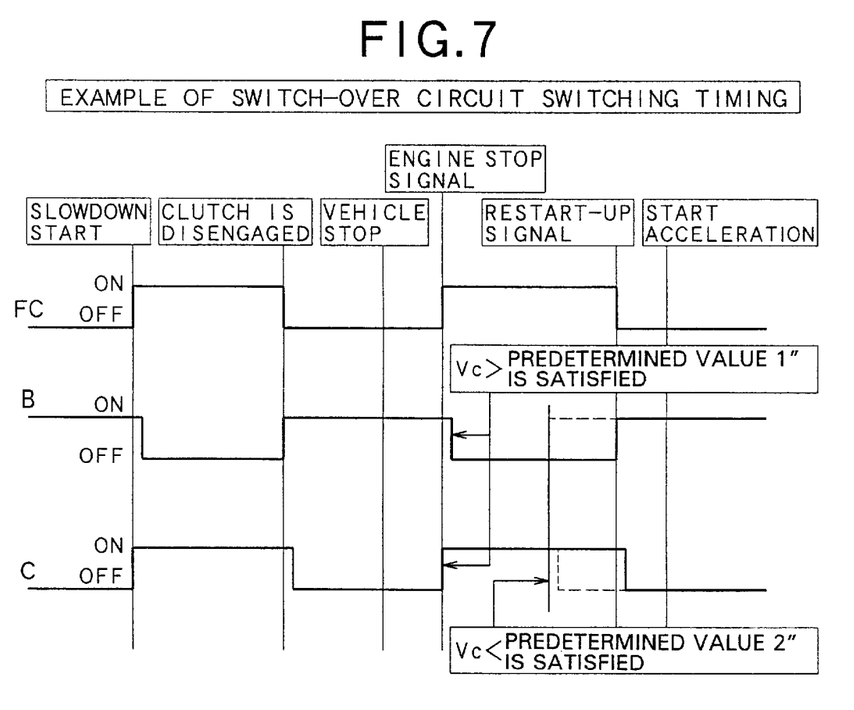
FIG. 7 is a timing chart showing switching timing for operation of a switch-over circuit.

FIGS. 6 and 7 show a second embodiment of this invention. In the second embodiment, when a part in the figures has the same function as that of the above-mentioned first embodiment, its reference numeral is the same as that in the first embodiment.

A characteristic of this second embodiment is to include one relay 52 (labeled "RL") connected to sub-battery 20 (labeled "Cp"), and to dispose a rise/fall pressure chopper 54 therebetween.

In other words, the switch-over means 28 (labeled "Power Control Unit") is linked to alternator 10 (labeled "ALT") through first signal line 56-1, and this alternator 10 is linked to electric power load (labeled "LOAD") through power supply line 32.

Moreover, one relay 52 is made for the sub-battery 20. A coil part 58 of the relay 52 is linked to switch-over means 28 through a second signal line 56-2. The main battery 24

(labeled "BATT") is linked to switch-over means 28 through third signal line 56-3, and a coil part 40 of relay 38 (labeled "RLB") of main battery 24 is linked to switch-over means 28 through a fourth signal line 56-4.

Further, the sub-battery 20 and the rise/fall pressure chopper 54 are linked to switch-over means 28 through fifth signal line 56-5. Furthermore, a fuel cut system 42 (labeled "FC (Fuel Cut )") is linked to switch-over means 28 through sixth signal line 56-6.

By this means, at slowdown, sub-battery 20 that is a second power supply can be sufficiently charged. In the same manner as the above-mentioned first embodiment, particularly, at engine stop in a vehicle having an idle stop system, sub-battery 20 can be used as a power supply for operating load such as a control system of an engine, a lamp and an air conditioning apparatus. Further, electric power of main battery 24 that is a first power supply used in vehicle start-up can be maintained. As a result, because a quantity of charge for main battery 24 that is a first power supply is not decreased, power-generating load by alternator 10 that is an electric power-generator can be reduced. Therefore, this system can contribute to improvement of fuel efficiency.

Moreover, sub-battery 20, can absorb slowdown energy that is not utilized conventionally. As a result, in the same manner as the above-mentioned first embodiment, a recharging driving efficiency of alternator 10 that is an electric power generator in engine slowdown becomes excellent. Accordingly, this system is profitable in practical use.

Figure 8:
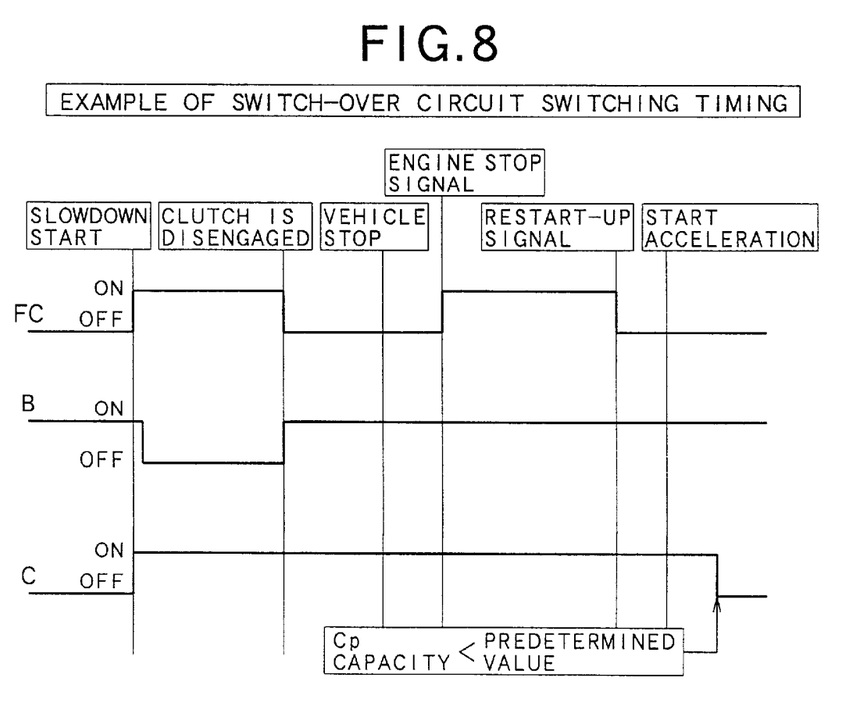
FIG. 8 is a timing chart showing switching timing for a switch-over circuit in a third embodiment of the present invention.

FIG. 8 shows third embodiment of this invention. This third embodiment is characterized by an arrangement wherein the sub-battery powerfully assists as a supporting power supply.

In other words, the sub-battery that is a second power supply is charged at slowdown in the same manner as in the above-mentioned embodiments. As shown in FIG. 8, even if the main battery that is a first power supply is linked, the sub-battery is also linked. Accordingly, after being charged, an electric current is provided from the sub-battery side, as well as the main battery.

When voltage capacity (labeled "Cp") of the sub-battery is smaller than a predetermined value, the sub-battery is placed in a non-linked state.

In the next vehicle slowdown, the sub-battery performs by providing a charge when a condition is satisfied.

By this means the sub-battery can be used as a supporting power supply, and good efficiency of electric current use can be realized. A quantity of charge required for main battery 24 is decreased. Accordingly, power-generating load by alternator 10 that acts as an electric power-generator can be reduced. Therefore, this system can contribute to fuel efficiency.

Moreover, sub-battery 20 can absorb a slowdown energy that is not utilized conventionally. As a result, in the same manner as in the above-mentioned first and second embodiments, a recharging driving efficiency of alternator 10 that acts as an electric power generator in slowdown becomes excellent. Accordingly, this system is profitable in practical use.

Figure 9:
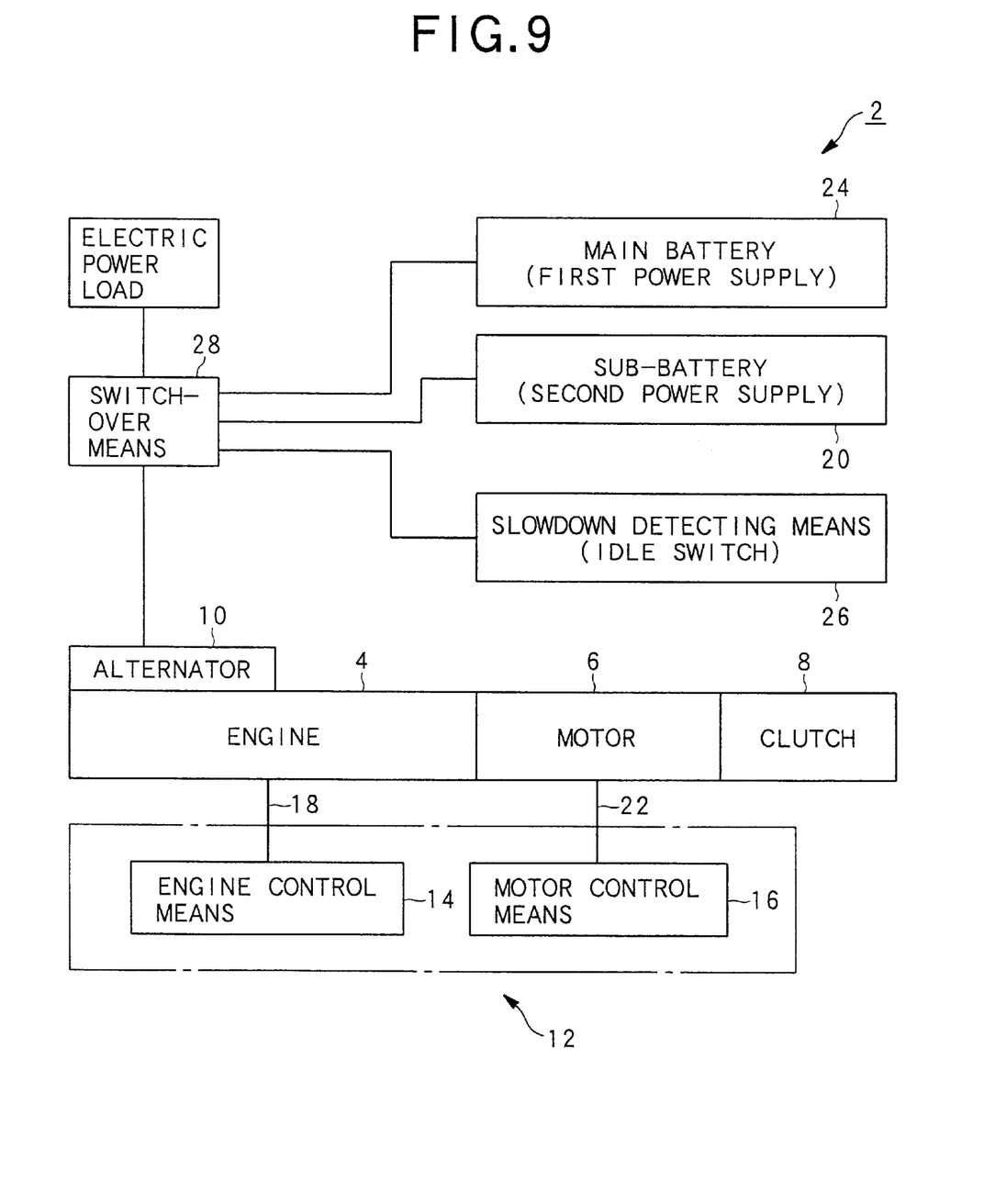
FIG. 9 is a block diagram showing a system of a power-generating control apparatus for a vehicle in a fourth embodiment of the present invention.

FIG. 9 shows a fourth embodiment of this invention. This fourth embodiment is characterized by a hybrid vehicle having motor 6.

FIG. 9 shows a power-generating control apparatus 2 for a vehicle (not shown)including an engine 4, motor 6, and a clutch 8. In the vehicle, the engine 4 and the motor 6 having both driving and power-generating functions are disposed as the vehicle-propelling system.

The motor 6 is connected directly to the engine 4. The transmission (not shown) is connected with the motor 6 through the clutch 8. The engine 2 includes an alternator 10 for power-generation, an air-compressor (not shown) for an air-conditioner (A/C) and a starter motor (not shown).

Incidentally, the motor 6 is positioned between the engine 4 and the clutch 8. In addition, the motor 6 includes a stator coil (not shown) and a rotor such as a flywheel (not shown).

The vehicle includes an engine control means 14 to control a driving state of the engine 4 as part of a control unit 12, and includes a motor control means 16 to control both driving and power-generating states of motor 6.

The engine 4 is connected to the engine control means 14 through an engine-controlling signal line 18. "Line" is used herein to describe any electrical signal conduit. The engine control means 14 is linked to a sub-battery 20 that acts as a second power supply through an engine control means-dedicated power line (not shown).

The motor 6 is linked to motor control means 16 through a signal line 22 for motor control. The motor control means 16 is linked to sub-battery 20 through the engine control means-dedicated power line by a motor control means-dedicated sub-power line (not shown). Further, the motor control means 16 is linked to a main power supply for the vehicle, namely main battery 24 that is a first power supply, by the motor control means-dedicated main power line (not shown). The main battery 24 supplies driving electric power to the motor 6 and is charged by generated electric power from the motor 6.

By this control means, at slowdown, sub-battery 20 can be sufficiently charged, particularly at engine stop in a vehicle having an idle stop system, so that the sub-battery 20 can be used as a power supply for an operating load, such as a control system of engine 4, a lamp and an air conditioning apparatus. Further, electric power of main battery 24 for use in start-up can be maintained. As result, because a quantity of charge for main battery 24 can be decreased, power-generating load by alternator 10 that is an electric power-generator can also be reduced. Therefore, this system can contribute to fuel efficiency.

Moreover, sub-battery 20 can absorb slowdown energy that is not utilized conventionally. As a result, in the same manner as the above-mentioned first embodiment, a recharging driving efficiency of alternator 10 that is an electric power generator in slowdown becomes excellent. Accordingly, this system is profitable in practical use.

Furthermore, the switch-over means 28 includes a function to switch over control so as to use main battery 24 as a power supply of operation load at start-up of engine 4. In the same manner as in the above-mentioned first embodiment, at engine stop, main battery 24 which maintains electricity, can be used. Accordingly, performance of start-up becomes excellent, and this system can contribute to stabilization of an engine control system and improvement of the product.

Furthermore, this invention is not limited to the above-mentioned first to fourth embodiments, but is suitable to many possible innovations and applications.

For example, in the first to fourth embodiments of this invention, an idle stop car and a hybrid car for 12V-based batteries has been explained, but other vehicles can be applied also. Therefore, this invention is not limited to idle stop controlled cars and hybrid cars, and can contribute greatly to improvement of fuel efficiency.

Further, if a high voltage system, for example, 24V or 36V based in vehicles will be realized, this invention can also cope with such 24V and 36V based batteries for vehicles.

Further, the switch-over means in the first embodiment of this invention, is explained as being arranged independently from engine control means of a control unit. However, for example, by adding a switch-over function of switch-over means to engine control means, the switch-over means can become integral with the engine control means.

Furthermore, in the first embodiment of this invention, at slowdown, by connecting the alternator motor to the second power supply, a slowdown energy is absorbed in the second power supply. However, this invention can also be arranged so that at charging, when the second power supply has been fully charged, slowdown energy is saved by switching over to control when a next use of slowdown energy is expected.

In other words, air-conditioner, filtration of various oils and forced cooling/heating of oil are expected to be a next use of slowdown energy. For example, in case of an air-conditioner, because refrigerant is cooled or heated beforehand by redundant slowdown energy, when coming into a state of use, then the refrigerant that is cooled or heated beforehand is utilized.

By this means, slowdown energy is utilized more effectively. Accordingly, this system can contribute to improvement of fuel efficiency.

What is claimed is:

1. A power-generating control apparatus for a vehicle which includes an engine for powering the vehicle and a power-generator operated by the engine or an electric motor, comprising: a slowdown detector to detect a slowdown state of a vehicle; a first power supply as a main power supply for the vehicle and a second power supply as a sub-power supply; and a switch-over circuit which switches over and connects one of the first and second power supplies while disconnecting the other of the first and second power supplies to said power-generator or said motor; wherein during operation of the vehicle, the switch-over circuit switches to connect the first power supply with the power-generator or the electric motor by switching connection from the second power supply to the first power supply to use the first power supply for an operation load, and in a slowdown state, in response to a detected signal from said slowdown detector, said switch-over circuit switches over to couple said power-generator or said motor and said second power supply, and in an engine stop, said switch-over circuit switches over to said second power supply for an operating load.

2. The power-generating control apparatus for a vehicle as defined in claim 1, wherein said switch-over circuit switches from said second power supply to said first power supply for the operating load in start-up of the engine.

3. The power-generating control apparatus for a vehicle as defined in claim 1, wherein said switch-over circuit switches from the first power supply to the second power supply to provide power to the operating load during engine stop, only when a voltage of the second power supply is higher than a predetermined voltage.

4. The power-generating control apparatus for a vehicle as defined in claim 3, wherein said power-generating control apparatus for a vehicle uses a storage battery as said first power supply and a capacitor as said second power supply.

5. The power-generating control apparatus for a vehicle as defined in claim 3, wherein said engine possesses an automatic start-up/stop system.

6. The power-generating control apparatus for a vehicle as defined in claim 1, wherein said power-generating control apparatus for a vehicle uses a storage battery as said main power supply and a capacitor as said sub-power supply.

7. The power-generating control apparatus for a vehicle as defined in claim 6, wherein said engine possesses an automatic start-up/stop system.

8. The power-generating control apparatus for a vehicle as defined in claim 1, wherein said engine possesses an automatic start-up/stop system.

9. The power-generating control apparatus for a vehicle as defined in claim 8, wherein said power-generating control apparatus for a vehicle uses a storage battery as said first power supply and a capacitor as said second power supply.

10. The power-generating control apparatus for a vehicle as defined in claim 1, wherein said vehicle includes a motor-generator having driving and power-generating functions directly connected to the output shaft of the engine.

11. The power-generating control apparatus for a vehicle as defined in claim 10, wherein said power-generating control apparatus for a vehicle uses a storage battery as said first power supply and a capacitor as said second power supply.

12. The power-generating control apparatus for a vehicle as defined in claim 10, wherein said engine possesses an automatic start-up/stop system.

13. A power-generating control apparatus for a vehicle which includes an engine for powering the vehicle and a power-generator operated by the engine or an electric motor, comprising: a slowdown detector to detect a slowdown state of a vehicle; a first power supply as a main power supply for the vehicle and a second power supply as a sub-power supply; and a switch-over circuit which switches over and connects one of the first and second power supplies while disconnecting the other of the first and second power supplies to said power-generator or said motor; wherein during operation of the vehicle, said switch-over circuit switches to connect the first power supply with the power-generator or the electric motor by switching connection from the second power supply to the first power supply to use the first power supply for an operation load, and in a slowdown state, in response to a detected signal from said slowdown detector, said switch-over circuit switches over to couple said power-generator or said motor with said second power supply, and when capacity of the second power supply is larger than a predetermined value even though the vehicle is running, said switch-over circuit switches from said first power supply to said second power supply to use for the operation load.

14. The power-generating control apparatus for a vehicle as defined in claim 13, wherein the vehicle includes a motor-generator having driving and power-generating functions directly connected to the output shaft of the engine.

15. The power-generating control apparatus for a vehicle as defined in claim 13, wherein said power-generating control apparatus for a vehicle uses a storage battery as said first power supply and a capacitor as said second power supply.

16. The power-generating control apparatus for a vehicle as defined in claim 13, wherein said engine possesses an automatic start-up/stop system.

17. A hybrid vehicle comprising:
an internal combustion engine for directly powering a drive shaft of the vehicle;
an electric motor connected to the internal combustion engine and having both driving and power-generating functions;
a slowdown detector for detecting slowing of the vehicle and providing a slowdown detection signal;
a main battery;

a sub-battery; and a switch-over circuit for switching between said main battery and said sub-battery to connect one of said batteries while disconnecting the other of said batteries with the electric motor, wherein, when said switch-over circuit receives the slow-down detection signal, said switch-over circuit connects said sub-battery to said electric motor to receive power generated by said electric motor, and when the internal combustion engine stops operating, said switch-over circuit connects said sub-battery to supply power to an operating load of said vehicle.

18. The hybrid vehicle as in claim 17, wherein said switch-over circuit connects said main battery to provide power to an alternator to start-up said engine.

19. The hybrid vehicle as in claim 17, wherein said sub-battery comprises a capacitor.

20. The hybrid vehicle as in claim 17, wherein, when said internal combustion engine stops operating, said switch-over circuit prevents connection of said sub-battery to the operating load when a voltage level of said sub-battery is less than a predetermined value.

* * * * *